(12) United States Patent  
Leiterer et al.

(10) Patent No.: US 11,315,371 B2  
(45) Date of Patent: Apr. 26, 2022

(54) TRANSPORTATION VEHICLE WITH ULTRAWIDEBAND COMMUNICATION

(71) Applicant: VOLKSWAGEN AKTIENGESELLSCHAFT, Wolfsburg (DE)

(72) Inventors: Jork Leiterer, Stahnsdorf (DE); Robert Dreyer, Berlin (DE)

(73) Assignee: VOLKSWAGEN AKTIENGESELLSCHAFT

(*) Notice: Subject to any disclaimer, the term of this patent is extended or adjusted under 35 U.S.C. 154(b) by 0 days.

(21) Appl. No.: 16/845,931

(22) Filed: Apr. 10, 2020

(65) Prior Publication Data

US 2020/0327753 A1 Oct. 15, 2020

(30) Foreign Application Priority Data

Apr. 12, 2019 (DE) .................... 10 2019 205 368.8

(51) Int. Cl.
| | |
|---|---|
| *G07C 9/00* | (2020.01) |
| *H04W 4/80* | (2018.01) |
| *G06F 8/65* | (2018.01) |
| *H04W 84/12* | (2009.01) |

(52) U.S. Cl.
CPC ........... *G07C 9/00309* (2013.01); *G06F 8/65* (2013.01); *H04W 4/80* (2018.02); *G07C 2009/00793* (2013.01); *G07C 2209/63* (2013.01); *H04W 84/12* (2013.01)

(58) Field of Classification Search
CPC ........... G07C 9/00309; G07C 2209/63; G07C 2009/00793; G07C 9/00571; H04W 4/80; H04W 84/12; H04W 4/02; H04W 4/023; H04W 4/40; B60R 25/20; B60R 25/102; G06F 8/65; G06F 8/60

See application file for complete search history.

(56) References Cited

U.S. PATENT DOCUMENTS

| | | | |
|---|---|---|---|
| 8,195,422 B2 * | 6/2012 | Wilcox ............... | A61K 31/365 |
| | | | 702/149 |
| 9,162,648 B1 * | 10/2015 | Weng ................ | G07C 9/00309 |
| 9,274,786 B2 | 3/2016 | Ji | |

(Continued)

FOREIGN PATENT DOCUMENTS

| | | |
|---|---|---|
| CN | 103946899 A | 7/2014 |
| CN | 107206966 A | 9/2017 |

(Continued)

OTHER PUBLICATIONS

Office Action for Chinese Patent Application No. 202010278058.8; dated Feb. 9, 2022.

*Primary Examiner* — Brian E Miller  
(74) *Attorney, Agent, or Firm* — Barnes & Thornburg LLP

(57) ABSTRACT

A transportation vehicle having: a keyless access system for the electronically controlled locking and unlocking of at least one vehicle door of the transportation vehicle and a UWB system having at least one UWB transceiver to transmit and receive UWB pulses via at least one antenna. In the transportation vehicle, the UWB system is used for a positioning method based on transit time measurements for determining the position of a second UWB system for controlling the keyless access system and for controlling the control unit for payload transmission with a third transceiver.

22 Claims, 1 Drawing Sheet

(56) References Cited

U.S. PATENT DOCUMENTS

| | | |
|---|---|---|
| 9,396,658 B2 | 7/2016 | Shimotani et al. |
| 9,464,905 B2* | 10/2016 | Lewis .................... H04L 9/0891 |
| 9,563,990 B2 | 2/2017 | Khan et al. |
| 9,911,259 B1* | 3/2018 | Ghabra .................... G07C 9/28 |
| 10,028,133 B2 | 7/2018 | Todorovic et al. |
| 10,102,687 B1* | 10/2018 | Sampigethaya ..... G07C 5/0825 |
| 10,311,661 B2* | 6/2019 | Menard ............... G01S 13/0209 |
| 10,410,450 B1* | 9/2019 | DeLong .................. B60C 23/02 |
| 10,477,346 B2 | 11/2019 | Brückner |
| 10,562,493 B2 | 2/2020 | Sammer et al. |
| 10,827,356 B2* | 11/2020 | Stahlin .................. H04W 12/08 |
| 2005/0256614 A1* | 11/2005 | Habermas ................ B60L 3/12 701/1 |
| 2008/0140278 A1* | 6/2008 | Breed .................... G07C 5/008 701/31.4 |
| 2013/0301584 A1* | 11/2013 | Addepalli ............... G06F 3/167 370/329 |
| 2013/0342379 A1* | 12/2013 | Bauman .............. G01S 13/0209 342/21 |
| 2017/0060559 A1* | 3/2017 | Ye ......................... G06F 21/572 |
| 2017/0195459 A1* | 7/2017 | e Costa .................... G06F 8/65 |
| 2017/0327083 A1* | 11/2017 | Verkin ..................... G07C 9/00 |
| 2017/0330402 A1* | 11/2017 | Menard ................ B60R 25/209 |
| 2018/0007507 A1* | 1/2018 | Ghabra ................... G01S 5/021 |
| 2018/0034936 A1 | 2/2018 | Correia e Costa et al. |
| 2018/0189049 A1* | 7/2018 | Madrid .................... G06F 21/78 |
| 2018/0349157 A1* | 12/2018 | Ahmed ..................... G06F 8/65 |
| 2019/0049262 A1* | 2/2019 | Grimm .................. G07C 5/008 |
| 2019/0272164 A1* | 9/2019 | Yamamuro ............. G06F 21/57 |
| 2019/0294429 A1* | 9/2019 | Mizutani ................ G06F 11/00 |
| 2020/0307403 A1* | 10/2020 | Rastoll .................... B60L 53/38 |

FOREIGN PATENT DOCUMENTS

| | | |
|---|---|---|
| CN | 107415893 A | 12/2017 |
| CN | 108712978 A | 10/2018 |
| DE | 102014223423 A1 | 6/2015 |
| DE | 112012006975 T5 | 8/2015 |
| DE | 102016006672 A1 | 12/2016 |
| DE | 102016007410 A1 | 12/2016 |
| DE | 102017124718 A1 | 4/2018 |
| DE | 102018113209 A1 | 12/2018 |
| SE | 1550722 A1 | 1/2017 |
| WO | 2015135630 A1 | 9/2015 |
| WO | 2018050178 A1 | 3/2018 |
| WO | 2018108899 A1 | 6/2018 |
| WO | 2018166944 A1 | 9/2018 |
| WO | 2019067105 A1 | 4/2019 |

* cited by examiner

TRANSPORTATION VEHICLE WITH ULTRAWIDEBAND COMMUNICATION

PRIORITY CLAIM

This patent application claims priority to German Patent Application No. 10 2019 205 368.8, filed 12 Apr. 2019, the disclosure of which is incorporated herein by reference in its entirety.

SUMMARY

Illustrative embodiments relate to a transportation vehicle, in particular, a transportation vehicle with a UWB system configured for a positioning method, and a control unit which is configured to control the UWB system for a payload data communication. In addition, illustrative embodiments relate to a method of a transportation vehicle and the use of a UWB system for a positioning method and for a payload data communication.

BRIEF DESCRIPTION OF THE DRAWINGS

Disclosed embodiments are explained below with reference to the associated drawings, in which.

DETAILED DESCRIPTION

Figure 1:
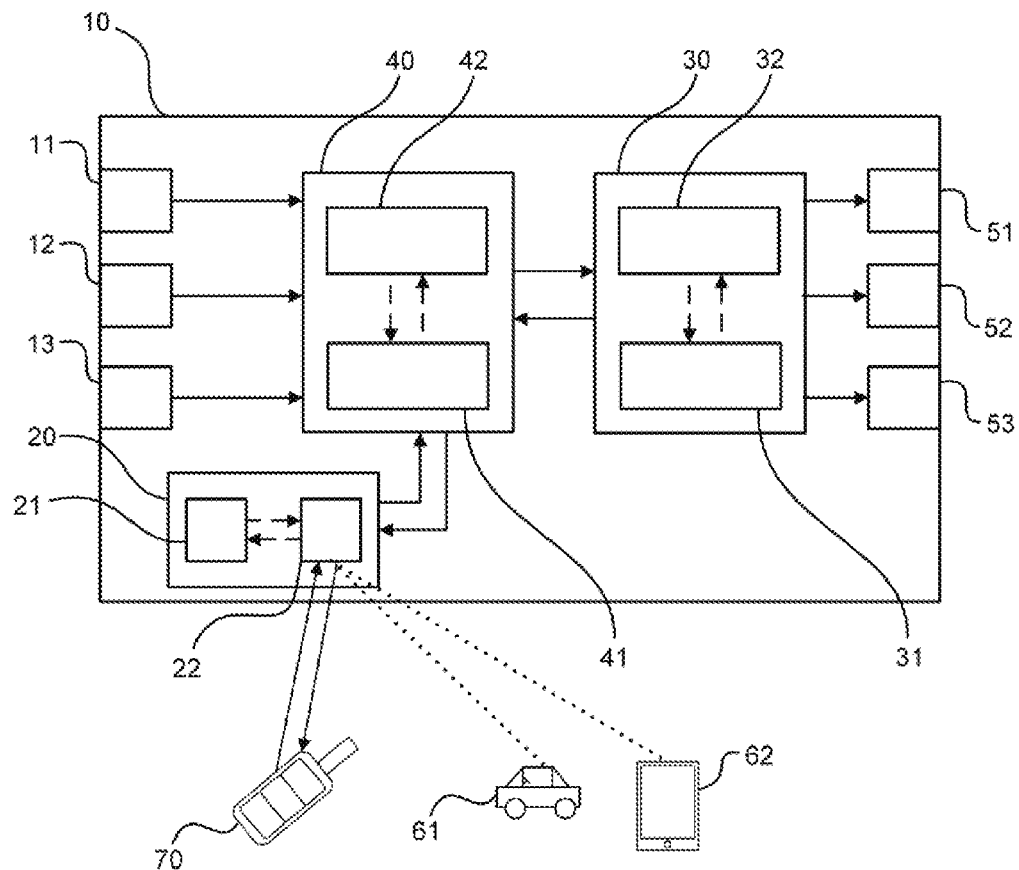
FIG. 1 shows a schematic view of an exemplary embodiment of a disclosed transportation vehicle.

Modern transportation vehicles have a multiplicity of electronic systems which can be used not only for the performance of the actual driving task but also for the entertainment and communication of the users. The driving task is performed, for example, with the involvement of engine control units, damping control systems, lane departure warning systems, distance warning systems and the like. An infotainment system configured for media playback and/or wireless communication is normally used for entertainment and communication.

Each of these electronic systems normally has at least one control unit programmed to perform the respective tasks. The maintenance and improvement of transportation vehicle performance and also safety facets can require the loading of software updates onto at least one control unit. These updates can comprise large data volumes which must then be loaded onto a multiplicity of transportation vehicles. This rollout of updates (Online Remote Update—ORU) onto entire transportation vehicle fleets imposes a load not only on the servers of the manufacturers or suppliers issuing the update, but also on a network architecture that is used. Only wireless interfaces are present in many transportation vehicles. These interfaces not only limit the transmission speeds available for the update, but also frequently incur high costs for the data transmission. A need therefore exists for methods for providing software updates to transportation vehicle fleets which enable high transmission speeds and incur low costs.

In addition, end users expect an improved connectivity of their transportation vehicles. The connection of mobile terminal devices, such as, for example, smartphones or tablets, to play back music or films and to control functions of the mobile terminal devices by use of input methods or mechanisms of the transportation vehicle is expected nowadays. To do this, new transportation vehicles normally have BLUETOOTH® or WLAN transceivers provided specifically for this purpose. However, these components increase the costs and installation space of the infotainment systems. Adapter solutions which connect to existing transportation vehicle interfaces exist in some cases for old transportation vehicles. However, the signal quality achieved with adapters and therefore the user experience are frequently unsatisfactory. A need therefore exists for alternative facilities for coupling mobile terminal devices with a transportation vehicle system with which installation space and costs can be saved.

Disclosed embodiments enhance the prior art and provide a method of a transportation vehicle for payload data transmission. A transportation vehicle configured for a method of this type is also provided.

This is achieved by a transportation vehicle, a method of a transportation vehicle and a use.

A first disclosed embodiments relates to a transportation vehicle, in particular, a passenger vehicle, having an internal combustion engine, an electric motor or a hybrid engine. The transportation vehicle has a keyless access system for the electronic locking and unlocking of at least one vehicle door of the transportation vehicle. The access system may have a central locking, particularly an electrically actuated central locking which is designed to unlock and lock the locks of the at least one transportation vehicle door. The keyless access system may be designed to open only specific transportation vehicle doors, for example, a driver's door or a tailgate. Alternatively, the access system is designed to open all vehicle doors of the transportation vehicle simultaneously.

Thanks to the keyless transportation vehicle access system, the user does not have to actively use the transportation vehicle key, in contrast to a radio remote control unit. No key press therefore needs to be performed, since carrying along the transportation vehicle key suffices as an identification feature. The user does not therefore have to take hold of the key, but can, for example, leave it in his pocket. The transportation vehicle automatically detects the approach of the key and allows the doors to be opened.

The disclosed transportation vehicle has an ultra-wideband (UWB) system with at least one UWB transceiver. The UWB transceiver is configured to transmit and receive UWB pulses via at least one antenna. The UWB system, in particular, the UWB transceiver, is designed to transmit and receive signals in very wide frequency ranges, particularly in a frequency range from 3.1 to 10.6 GHz, optionally in a frequency range from 3.5 to 9 GHz, particularly in a frequency range from 6 GHz to 8.5 GHz. The transmit power of the UWB pulses is low.

The bandwidth of the UWB system is at least 500 MHz and the UWB system, in particular, the UWB transceiver, may be designed to transmit signals with a transmit power between 0.5 mW/−41.3 dBm/MHz. The UWB system, in particular, the UWB transceiver, furthermore may be designed in accordance with the IEEE 802.15.4 standard (in particular, the sections relating to the UWB PHY Layer) and optionally in accordance with the IEEE 802.15.4z standard. UWB signals interfere only minimally with other radio signals due to the dispersion of the signals over wide frequency ranges of this type. Temporally strongly localized transmit pulses can be transmitted with full width at half maximum (FWHM) by UWB transceivers. This is based on the high-frequency width of the transmit pulses ($DE*Dt>const.$). Signals are thus suitable for time-resolved transit time measurements and enable positionings with high very local resolution.

The transportation vehicle furthermore has a control device which may have at least one integrated circuit, microcontroller or ASIC and is designed and configured, in other words is structured, to carry out the following operations. The control device can have a centralized or decentralized/modular structure. The control device is initially designed and configured to control the UWB system, in particular, the UWB transceiver, to carry out a positioning method based on transit time measurements to determine the distance, optionally the position, of a second UWB transceiver. Methods of this type are known in principle to the person skilled in the art for avoiding RSA—Relay Station Attacks.

Relay Station Attacks on keyless access systems (Keyless Entry, Keyless Go, Keyless Safe) are known and are now also being actively exploited. In known keyless transportation vehicle access systems, the approach of the key to the transportation vehicle is determined simply via a field strength measurement. This simple type of distance measurement implementation is exploited in the Relay Station Attack (RSA).

An attacker positions one or more radio amplifiers between the transportation vehicle and the key and thereby increases the transmit power of the radio signals emitted by the key and detected by the transportation vehicle. The transportation vehicle thus erroneously locates the key at a position closer than its real position on the basis of the field strength measurement. RSA attacks thus enable the transportation vehicle of a user to be opened even if the user is located outside the normal range of the keyless access system, e.g., in a cafe or at home, and believes his transportation vehicle to be securely locked.

In these RSA attacks, it is furthermore not necessary to read the signal or decode its encryption, since no falsified commands are transmitted by the attacker, but instead the original signals from the transportation vehicle and key are simply amplified. Any cryptographic protective measures are therefore ineffective in the case of this attack.

A technique known as "Relay Station Attack Defense", RSAD for short, has been developed as a measure against this attack. The transportation vehicle is equipped for this purpose with at least one, optionally a plurality of UWB systems which enable the distance of a key to be determined, not via a field strength, but via a transit time measurement.

In the case of a transit time (time off light—ToF) measurement of this type, a first signal pulse is essentially transmitted from the UWB system of the transportation vehicle to a second UWB system of a transportation vehicle key. After a certain processing time, a second UWB pulse is transmitted from the vehicle key back to the transportation vehicle.

On the basis of this time between the transmission of the first UWB pulse and the reception of the second UWB pulse t2−t1, reduced by the processing time DtVB, the distance d between the first UWB system of the transportation vehicle and the second UWB system of the transportation vehicle key can be determined on the basis of the propagation speed of the UWB pulses, i.e., the speed of light, according to $d=((t2-t1)-DtVB/2c)$.

The use of UWB systems enables the use of temporally high-resolution signal pulses and therefore a spatial resolution of significantly less than one meter. A preliminary initialization may be performed to activate the UWB system of the transportation vehicle key through polling by the UWB system of the transportation vehicle. The battery of the transportation vehicle key is thus spared, its capacity being less than that of the transportation vehicle battery.

The disclosed control device of the transportation vehicle may be designed to control the UWB system of the transportation vehicle in such a way that a first UWB pulse is transmitted at time t1 to the second UWB system, and to control it in such a way that a time t2 is detected at which a second UWB pulse is received from the second UWB system. The control device furthermore may be configured to perform an initialization of the second UWB system of the transportation vehicle key (wake-up) by the UWB system, for example, by an ID number of the second UWB system or of the transportation vehicle key. The control device is furthermore designed to determine a distance between the first UWB system and the second UWB system on the basis of the times t1 and t2 and stored values for the speed of light and an average processing time DtVB. The distance measurement by transit time determination is known in principle from the prior art and does not represent the essence of the disclosure.

The transit time measurement may have further features in make the distance measurement more precise and/or more secure against attacks. A device or a key system as described in WO 2015135630 A1, to which reference is hereby made in this respect, is optionally used. A commercially available product such as the 3DB6830 UWB IC from 3DB ACCESS AG is similarly optionally used. The transportation vehicle has four UWB systems, wherein one UWB system is located in each case on a vehicle corner of the transportation vehicle. The control device may be of modular design and is partially integrated into the UWB system(s), for example, with a view to controlling the transit time measurement.

The disclosed control device of the transportation vehicle is furthermore designed and configured to control the access system to lock or unlock the at least one transportation vehicle door based on a result of the positioning method. The result is at least a distance between the transportation vehicle and the vehicle key, particularly if only one UWB system is present in the transportation vehicle. If the transportation vehicle has a plurality of UWB systems, particularly on each transportation vehicle corner, a triangulation of the key and its position relative to the transportation vehicle are determined by the transit time measurements.

With knowledge of the position of the transportation vehicle, for example, via GPS, the absolute position of the transportation vehicle key is therefore also determinable. The control device is furthermore designed to determine, on the basis of the distance of the key, optionally also on the basis of the relative or absolute position of the transportation vehicle key, whether an unlocking of the at least one transportation vehicle door is intended to take place. The doors may be unlocked if the distance between the vehicle key and a transportation vehicle is less than a predefined limit value. The position of the key may equally be used to unlock, for example, only the driver's door or the tailgate.

The disclosed control device is furthermore configured to control the UWB system, in particular, the UWB transceiver, additionally for payload data transmission with a third transceiver. The control device thus controls the at least one UWB system to transmit payload data to the third transceiver and to receive payload data from the third transceiver. The control unit may control the modulation/demodulation and/or the coding/decoding of the payload data to be transmitted or received by the UWB system. In other words, the control device is designed to use the existing hardware of the UWB system for payload data transmission.

According to the disclosed embodiments, payload data does not refer, in particular, to signals required for a transit time measurement. In addition to the actual payload data, payload data transmission can nevertheless include control and/or protocol information, such as, for example, data headers, etc. The payload data transmission may be performed without a hardware modification of known UWB systems, an adaptation of the signals received and transmitted by the UWB system in line with other radio standards, such as, for example, WLAN, optionally being performed by software as "software-defined radio". Alternatively or additionally, the hardware of the UWB systems is adapted to the payload data transmission, for example, through alternative antenna geometries.

A disclosed transportation vehicle with the at least one UWB system designed and configured for the positioning method has at least one radio transceiver which is already suitable for very high data rates. Data rates between 480-1320 Mbit/s are achievable in accordance with already known UWB standards. These data rates are required, if at all, only for short time periods for the positioning method. Some UWB systems which are used for positioning methods furthermore have more than one UWB system, wherein each transceiver can achieve the aforementioned data rates and the total throughput increases accordingly.

The UWB system and frequency band are not required for most of the time, in particular, not while the transportation vehicle is travelling. The at least one WB system is thus available for other applications during this time without restriction of the primary function, i.e., the positioning method. The disclosed transportation vehicle enables these unused resources of the UWB systems to be used for other tasks, in particular, for payload data communication.

Costs and weight are saved through the integration of additional functions into the existing UWB hardware as opposed to separate components. A novel use of existing UWB systems, in particular, for communication with additional communication partners, is thus implemented according to the disclosure.

In at least one disclosed embodiment of the transportation vehicle, the control device is designed and configured to control the UWB system for payload data communication with a UWB transceiver of a different transportation vehicle. In other words, the control device is designed and configured to establish Car2Car communication by the system. The bandwidth and the high data transmission rate of the UWB systems can therefore be used for Car2Car communication as soon as a plurality of transportation vehicles are equipped with a UWB-based RSAD system. The high data rates enable the shortest transmission times, wherein even waiting times at traffic lights may be sufficient.

Data transmitted between the disclosed transportation vehicles by the UWB system may be software updates for at least one control unit of the disclosed transportation vehicle. The aforementioned problems of the prior art are therefore overcome. Only a few transportation vehicles have to obtain updates from a central server, as a result of which the load on the servers and also on the network infrastructure decreases. These few transportation vehicles distribute the obtained updates to other nearby transportation vehicles by the UWB systems.

The transmission can be performed more quickly than in the case of a download from the Internet due to the high data rates of the UWB-based communication between the disclosed transportation vehicles. In addition, no telecommunication charges for the data transmission are incurred for the UWB-based communication. Car2Car communication can furthermore take place between the disclosed transportation vehicles from one manufacturer in accordance with a vendor-specific protocol, so that an agreement on a uniform radio standard in an international standards organization is not required for this purpose.

In a similar exemplary embodiment of the disclosed transportation vehicle, the control device is configured to control the UWB system for payload data communication with a WLAN transceiver of a mobile terminal device. The WLAN communication may take place in accordance with IEEE802.11n.

In other words, the UWB systems according to this disclosed embodiment serve as a WLAN access point along with their primary function, i.e., the positioning method. As already explained, the UWB systems are largely functionless when travelling. Even when stationary, the UWB systems are used only temporarily, for time periods of milliseconds. A secondary use as a WLAN access point to an on-board electrical system, in particular, an infotainment system of the transportation vehicle, is therefore particularly beneficially.

UWB systems, particularly UWB transceivers whose frequency ranges in any case already cover the frequency ranges of WLAN standards, may be used. UWB transceivers which operate in a frequency range between 6.2 and 7.8 GHz (Atmel ATA5350) or which operate in the frequency range between 3.5 and 6.5 GHz (Decawave DW1000) may be used. The WLAN frequency range can therefore be readily covered by the UWB system. Transmit amplifiers may be provided for an adjustment of the transmit power.

The use of the UWB systems provided in any case in the transportation vehicle as WLAN access points reduces manufacturing costs, as well as the weight and, ultimately, consumption. The possibility of malfunction is also reduced with the use of fewer components. If a plurality of UWB systems are provided, as is customary in conventional positioning methods, the probability of failure of the on-board WLAN is furthermore reduced.

Along with the UWB systems used for the positioning method, the disclosed transportation vehicle may have further UWB systems which are positioned on the transportation vehicle to optimize the payload data transmission. A further UWB system may be provided in the transportation vehicle passenger compartment, particularly in the roof lining, to achieve the highest possible signal strength for the WLAN. Development costs are nevertheless saved through the use of additional UWB systems as radio access points, wherein uniform interfaces can furthermore be used.

In at least one exemplary embodiment of the disclosed transportation vehicle, the at least one UWB system has an interface to an on-board electrical system, wherein the interface is designed and configured for payload data communication. In other words, the interface, under the control of the control device, enables the modulation/demodulation and/or coding/decoding of payload data to be transmitted/received in accordance with UWB protocols or in accordance with other radio standards, such as WLAN.

In a similarly exemplary embodiment of the disclosed transportation vehicle, the control device further has an interface to a memory. Alternatively or additionally, the control device controls an interface to a memory. The control device is further configured to store data received by the UWB system, in particular, user data, (via the interface) in the memory. The control device may be designed to load payload data to be transmitted (via the interface) from the memory. This interface is not required in the UWB systems according to the prior art which normally have an internal memory for credentials of the positioning method.

A further disclosed embodiment relates to a method of a transportation vehicle having a control device and at least one UWB system with at least one UWB transceiver which is configured to transmit and receive UWB pulses via at least one antenna. The disclosed method entails controlling the UWB system to carry out a positioning method based on transit time measurements for determining the position of a second UWB system, and controlling the UWB system for payload data transmission with a third transceiver by a control unit, wherein the control is performed in each case by a control device of the transportation vehicle.

Controlling the UWB system to carry out a positioning method based on transit time measurements for determining the position of a second UWB system optionally entails at least the following: controlling the first UWB system to transmit a first UWB pulse to the second UWB system at time t1, controlling the first UWB system to receive a second UWB pulse from the second UWB system at time t2, determining a total transit time on the basis of the transit times of the first UWB pulse, the second UWB pulse and a processing time of the second UWB system DTVB, and determining a distance between the first and the second UWB system on the basis of the total transit time and the speed of light.

Controlling the UWB system for payload data transmission with a third transceiver optionally entails the following: controlling the first UWB system to modulate/demodulate and/or code/decode payload data to be transmitted and/or received by the UWB system, and storing and/or loading the payload data to be transmitted and/or received in a memory via an interface.

In at least one exemplary embodiment of the disclosed method, the payload data are received from a UWB transceiver of a different transportation vehicle, in other words by Car2Car communication. In this disclosed embodiment, the payload data may have a software update for at least one control unit of the transportation vehicle. The software update was previously received by the different transportation vehicle, similarly by Car2Car communication or via a conventional network connection (mobile radio, LAN, WLAN). The method similarly may entail transmitting the payload data, in particular, the software update, to a UWB transceiver of at least one further transportation vehicle. According to this disclosed embodiment, the software update may similarly be stored in the transportation vehicle and is loaded and installed on the at least one control unit.

If a software update is transmitted in the disclosed method by UWB communication for at least one control unit of the disclosed transportation vehicles, the aforementioned problems of the prior art are overcome. Only a few transportation vehicles have to obtain updates from a central server, as a result of which the load on the servers and also on the network infrastructure decreases. These few transportation vehicles further distribute the obtained updates to other transportation vehicles.

In at least one exemplary embodiment of the disclosed method, the payload data are received from or are transmitted to a WLAN transceiver of a mobile terminal device, such as a smartphone or tablet. The received data may be media files which a user has stored on his terminal device and plays back via the multimedia system of the transportation vehicle. The transmitted data may similarly be data retrieved by the transportation vehicle from a network, the data being forwarded to the terminal device. For the mobile terminal device, the transportation vehicle acts, for example, as an access point to the Internet.

In at least one exemplary embodiment of the disclosed method, the method further entails storing payload data received by the UWB system in a memory. The method similarly may entail loading payload data to be transmitted by the UWB system from the memory. The data may furthermore be stored temporarily in a buffer memory controlled by the control unit before transmission or after reception. The memory may be a memory integrated into the control device, a memory of at least one further control unit of the transportation vehicle or a central memory of the transportation vehicle, for example, for media files or downloads.

The disclosed method can be implemented by electrical or electronic modules or components (hardware), by firmware (ASIC), or can be realized by methods or mechanisms during the execution of a suitable program (software). The disclosed method may similarly be realized or implemented through a combination of hardware, firmware and/or software. Individual components may similarly be designed as a separately integrated circuit or are arranged on a common integrated circuit to carry out individual method operations. Individual components configured to carry out individual method operations may furthermore be arranged on a flexible printed circuit board, a printed circuit board (PCB), a tape carrier package (TCP) or other suitable substrate.

The individual method operations of the disclosed method are furthermore designed as one or more processes which run on one or more processors in one or more electronic computing devices and are created during execution by one or more computer programs. The computing devices may be designed to interwork with other components, in particular, a UWB system, to perform the functionalities described herein.

The instructions of the computer programs may similarly be stored in a memory, such as, for example, a RAM element. However, the computer programs can also be stored in a non-volatile storage medium, such as, for example, a CD-ROM, a flash memory or the like.

It is furthermore evident to the person skilled in the art that the functionalities of a plurality of computers (data processing devices) can be combined or can be combined in a single device, or that the functionality of a specific data processing device can be provided as distributed among a multiplicity of devices to carry out the operations of the disclosed method without deviating from the method illustrated.

A further disclosed embodiment relates to a computer program, comprising commands which, during the execution of the program by a computer, such as, for example, a control unit of a transportation vehicle having a UWB system with at least one UWB transceiver which is configured to transmit and receive UWB pulses via at least one antenna, prompt the computer to carry out the disclosed method, in particular, a positioning method based on transit time measurements of UWB pulses for a second UWB system and a payload data transmission with a third transceiver; furthermore optionally to receive payload data from a UWB transceiver of a different transportation vehicle, the data having a software update for at least one control unit of the transportation vehicle; and/or to receive or transmit payload data from or to a WLAN transceiver of a mobile terminal device. A further disclosed embodiments relates to a use of a UWB system of a transportation vehicle, having at least one antenna and at least one UWB transceiver configured to transmit and receive UWB pulses by the antenna, to carry out a positioning method based on transit time measurements for determining the position of a second UWB system and for payload data transmission with a third transceiver. The UWB system may be used for receiving software updates for at least one control unit of the transportation vehicle from a UWB transceiver of a different transportation vehicle and/or for transmitting/receiving WLAN data to/from a mobile terminal device.

The different embodiments specified in this application are combinable with one another, unless otherwise stated in individual cases.

FIG. 1 shows a schematic view, in particular, a block diagram, of an example of a transportation vehicle 10, in particular, a two-track transportation vehicle, having an internal combustion engine, an electric motor or a hybrid engine. The transportation vehicle 10 comprises a multiplicity of first sensors, in particular, a first sensor 11, a second sensor 12, and a third sensor 13. The first sensors 11, 12, 13 are configured to capture environment information or environment data of the transportation vehicle 10 and comprise, for example, temperature sensors, a camera, a microphone and/or distance sensors. The first sensors 11, 12, 13 transmit the measurement signals captured by them to a control device 40 of the transportation vehicle 10.

The transportation vehicle 10 further has a keyless access system 30 which is designed to control, in particular, to unlock and lock at least one vehicle door 51, 52, 53 of the transportation vehicle 10. The keyless access system 30 is designed according to the exemplary embodiment shown as an independent control unit 30 with its own CPU 32 and an internal memory 31. Alternatively, however, the function of the control unit can also be performed by the control unit 40. The keyless access system 30 controls, in particular, a driver's door 51, a front passenger door 52 and a tailgate 53 of the transportation vehicle 53 depending on a distance and/or a position of a transportation vehicle key 70. An insertion of the key 70 into the locks of the doors 51, 52, 53 is possible but not necessary.

The transportation vehicle further has a UWB system 20 with a UWB transceiver 21 and an antenna 22. The UWB transceiver 21 is designed and configured to transmit and receive UWB pulses via the antenna 22. The UWB system 20 is controlled by a control unit 40 of the transportation vehicle 10 via a suitable data bus which connects the control unit 40 and the UWB system 20.

Under the control of the control unit 40, the UWB system 20 is designed to detect the distance of the transportation vehicle key 70 by a positioning method based on transit time measurements of UWB pulses. To do this, the UWB system 20 transmits a first UWB pulse under the control of the control device 40 at a time t1 to the transportation vehicle key 70. In response, the UWB system receives a second UWB pulse from the transportation vehicle key at a time t2 (indicated in the figure by arrows). Based on these times and, where appropriate, further information stored in the UWB system 20 or in the memory 41 of the control unit, for example, relating to a processing time DtVB of the first UWB pulse in the transportation vehicle key 70, the UWB system 20 or the control device 40 determines a distance between the first UWB antenna 22 and an antenna of a second UWB system of the transportation vehicle key 70. The UWB system 20 is secure against Relay Station Attacks (RSA) and is therefore also referred to as a Relay Station Attack Defense (RSAD) system.

In addition, the UWB system 20 of the disclosed transportation vehicle 10 is also designed and configured to communicate, under the control of the control unit 40, with a third transceiver. The third transceiver is, in particular, a third transceiver of a different transportation vehicle 61 or of a mobile terminal device 62. The transportation vehicle 61 may be designed in exactly the same way as the transportation vehicle 10, and the mobile terminal device 62 may be a smartphone. The third transceiver of the transportation vehicle 61 is therefore similarly a UWB system which corresponds, for example, to the UWB system 20 of the transportation vehicle 10. The third transceiver of the mobile terminal device 60 is a WLAN transceiver.

The control unit 40 of the disclosed transportation vehicle 10 is configured to carry out the disclosed method, as explained below with reference to FIG. 2. For this purpose, the control unit 40 has an internal memory 41 and a CPU 42 which communicate with one another, for example, via a suitable data bus. In addition, the control unit has a communication connection to at least the first sensors 11, 12, 13, the UWB system 20 and the keyless access system 30, for example, via one or more respective CAN connections, one or more respective SPI connections or other suitable data connections.

Figure 2:
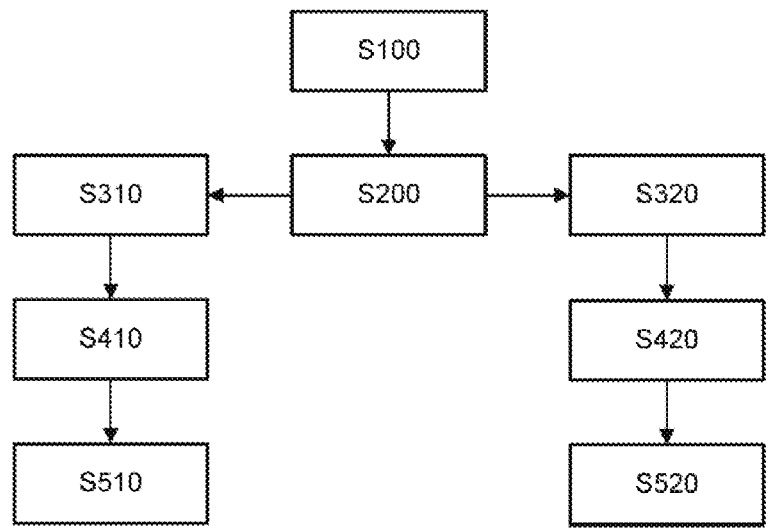
FIG. 2 shows a schematic view of an exemplary embodiment of a disclosed method.

FIG. 2 shows a schematic view of a disclosed method according to at least one exemplary embodiment. In a first operation at S100 of the disclosed method, the control device 40 controls the UWB system 20 to carry out a method based on transit time measurements for determining the distance of the transportation vehicle key 70. In other words, the control device 40 and the UWB system 20 perform an "RSAD keyless go" method for determining the location of the key 70.

In an operation at S200, at least one transportation vehicle door is unlocked and, if necessary, opened by the keyless access system 30. This procedure is based on the result of the determination of the location of the transportation vehicle key 70 by the UWB system 20 and the control device 40, indicating that the key is located within a predefined distance around the transportation vehicle 10. The transportation vehicle 10 is then started and the driving operation of the transportation vehicle 10 begins. The primary function of the UWB system 20 is thus ended with operation at S200. A further location of the transportation vehicle key 70 while the transportation vehicle 10 is travelling is not necessary. In the disclosed transportation vehicle 10, the UWB system 20 is thus available for payload data transmission with a third transceiver 61, 62.

In a first exemplary embodiment of the disclosed method, the transportation vehicle 10 receives a message in operation at S310 indicating that a software update is necessary for the at least one control unit of the transportation vehicle 10 and has already been distributed to other transportation vehicles. This message may be received via a conventional network connection, for example, mobile radio. In operation at S310, the control device 40 of the transportation vehicle 10 then controls the UWB system 20 to establish a radio link to the UWB systems of other transportation vehicles nearby. The control device 40 of the transportation vehicle 10 further controls the UWB system 20 in operation at S310 to transmit a query to the other transportation vehicles to establish whether they have already received the software update. This may be done by an identifier of the software update which the transportation vehicle 10 may receive by the aforementioned message. Operation at S310 ends as soon as a UWB connection has been established to a different transportation vehicle which already has the at least one software update.

In operation at S410, the control device 40 then controls the UWB system 20 of the transportation vehicle 10 to receive the at least one software update from the other transportation vehicle via the established UWB connection.

Due to the high bandwidth and the data rate associated therewith, the data transfer takes place in a fraction of the time which would be required for a transmission with conventional wireless interfaces, for example, via a mobile radio network. In at least one disclosed embodiment, the software update is received in segmented form from a plurality of different transportation vehicles by UWB connections established with these transportation vehicles. In this exemplary embodiment, an identifier is used for the segments of the software update. The time during which a connection in each case must exist is thus further reduced. Stopping near to another transportation vehicle at a red traffic light can suffice due to the high data rates.

In operation at S510, the downloaded software update is finally stored on an internal memory of the m transportation vehicle 10, for example, the memory 41 of the control device 40. The software update is further loaded and installed on the associated control unit. The software update is now further available in the transportation vehicle 10 for transmission to other transportation vehicles by Car2Car communication. A communication of this type is performed in response to a UWB radio request from another transportation vehicle for the software update or a segment thereof by an identifier.

In a second exemplary embodiment of the disclosed method, the control device 40 receives a request in operation at S320 via the UWB system 20 or a different interface to set up a WLAN radio link to a mobile terminal device 62. The control device 40 then controls the UWB system to set up a radio link in accordance with the WLAN standard to the mobile terminal device 62.

In operation at S420, payload data, in particular, music data, are then received from the mobile terminal device 62 of a user via the UWB system 20. The control device 40 further controls a memory interface to temporarily store the received music data in an internal memory 41 of the control device.

In operation S520, the received music files are finally played back via a multimedia system of the transportation vehicle 10. The playback may be performed as streaming, wherein the data temporarily stored in the memory 41 are deleted or overwritten following the playback. The memory 41 thus acts simply as a buffer memory for the disclosed transmission method.

REFERENCE NUMBER LIST

10 Transportation vehicle
11 First sensor
12 Second sensor
13 Third sensor
20 UWB system
21 UWB transceiver
22 UWB antenna
30 Access system
31 Memory
32 CPU
40 Control unit
41 Memory
42 CPU
51 Driver's door
52 Front passenger door
53 Tailgate
61 Transportation vehicle
62 Smartphone
70 Second UWB system (radio key)

The invention claimed is:

1. A first Ultra-Wide Band (UWB) system of a transportation vehicle, the first UWB system comprising a first transceiver,
wherein the first UWB system is configured to perform transportation vehicle positioning based on transit time measurements for determining a position of a second UWB system having a second transceiver,
wherein the first UWB system is further configured to perform payload data transmission to at least one third transceiver included in another, transportation vehicle or a mobile terminal device,
wherein the first UWB system receives software updates for at least one control unit of the transportation vehicle via payload data received from the at least one third transceiver,
wherein the first UWB system transmits and receives WLAN data to and from at least one third transceiver,
wherein, as part of receiving software updates from the at least one third transceiver, the first UWB system establishes a radio link to a UWB system of the at least one third transceiver in response to receipt of at least one message via a mobile radio network connection indicating that a software update is necessary for the at least one control unit and that the software update has already been distributed to another transportation vehicle or mobile terminal device that is nearby, thereafter, the first USB system transmits a query to establish whether the at least one third transceiver has already received the software update until a UWB connection has been established to at least one transceiver in a transportation vehicle or mobile terminal device that has already received the software update.

2. The first UWB system of claim 1, wherein, following establishment of a connection to at least one transceiver in a transportation vehicle or mobile terminal device that has already received the software update, the first UWB system receives the at least one software update via established UWB connection.

3. The first UWB system of claim 2, wherein the software update is received in segmented form via a plurality of third transceivers corresponding respectively to a plurality of transportation vehicles or mobile terminal devices by UWB connections established via the third transceivers.

4. The first UWB system of claim 3, wherein an identifier is used for segments of the software update.

5. The first UWB system of claim 2, wherein, following receipt of the at least one software update via the established UWB connection, the software update is stored in memory and available for transmission to other transportation vehicles.

6. A transportation vehicle comprising:
a keyless access system for electronically controlled locking and unlocking of at least one vehicle door of the transportation vehicle;
a first Ultra-Wide Band (UWB) system including a first transceiver configured to transmit and receive UWB pulses via at least one antenna; and
a control device configured to control:
the first UWB system to perform transportation vehicle positioning based on transit time measurements for determining the position of a second UWB system including a second transceiver and configured to perform payload data transmission to at least one third transceiver included in another, transportation vehicle or a mobile terminal device, and the keyless access system being configured to lock or unlock the at least one transportation vehicle door based on a result of the transportation vehicle positioning, wherein the first UWB system receives software updates for at least one control unit of the transportation vehicle via payload data received from at least one third transceiver, wherein the first UWB system transmits and receives WLAN data to and from at least one third transceiver, wherein, as part of receiving software updates from the at least one third transceiver, the first UWB system establishes a radio link to a UWB system of the at least one third transceiver in response to receipt of at least one message via a mobile radio network connection indicating that a software update is necessary for the at least one control unit and that the software update has already been distributed to another transportation vehicle or mobile terminal device that is nearby, thereafter, the first USB system transmits a query to establish whether the at least one third transceiver has already received the software update until a UWB connection has been established to at least one transceiver in a transportation vehicle or mobile terminal device that has already received the software update.

7. The transportation vehicle of claim 6, wherein the control device includes or controls an interface to a memory, and wherein the control device at least one of stores payload data received by the first UWB system in the memory and loads payload data to be transmitted by the first UWB system from the memory.

8. The transportation vehicle of claim 6, wherein, following establishment of a connection to at least one transceiver in a transportation vehicle or mobile terminal device that has already received the software update, the first UWB system receives the at least one software update via established UWB connection.

9. The transportation vehicle of claim 8, wherein the software update is received in segmented form via a plurality of third transceivers corresponding respectively to a plurality of transportation vehicles or mobile terminal devices by UWB connections established via the third transceivers.

10. The transportation vehicle of claim 9, wherein an identifier is used for segments of the software update.

11. The transportation vehicle of claim 8, wherein, following receipt of the at least one software update via the established UWB connection, the software update is stored in memory and available for transmission to other transportation vehicles.

12. A method of a transportation vehicle having a first Ultra-Wide Band (UWB) system with at least one control unit and a first transceiver configured to transmit and receive UWB pulses via at least one antenna, the method comprising:

controlling the first UWB system to perform transportation vehicle positioning based on transit time measurements for determining a position of a second UWB system having a second transceiver; and controlling the first UWB system to perform payload data transmission to at least one third transceiver included in another transportation vehicle or a mobile terminal device, wherein the at least one third transceiver includes a transceiver of a different transportation vehicle or of a mobile terminal device, wherein the first UWB system receives software updates for at least one control unit of the transportation vehicle via payload data received from the at least one third transceiver, wherein the first UWB system transmits and receives WLAN data to and from at least one third transceiver, wherein, as part of receiving software updates from the at least one third transceiver, the first UWB system establishes a radio link to a UWB system of the at least one third transceiver in response to receipt of at least one message via a mobile radio network connection indicating that a software update is necessary for the at least one control unit and that the software update has already been distributed to another transportation vehicle or mobile terminal device that is nearby, thereafter, the first USB system transmits a query to establish whether the at least one third transceiver has already received the software update until a UWB connection has been established to at least one transceiver in a transportation vehicle or mobile terminal device that has already received the software update.

13. The method of claim 12, further comprising at least one of:

storing the payload data received by the first UWB system in a memory; and loading, from the memory, the payload data to be transmitted by the first UWB system.

14. The method of claim 12, wherein the transportation vehicle positioning is performed for payload data transmission to the at least one third transceiver.

15. The method of claim 12, wherein the first UWB system is part of a transportation vehicle that includes a keyless access system for electronically controlled locking and unlocking of at least one vehicle door of the transportation vehicle, wherein the first transceiver of the first UWB system transmits and receives UWB pulses via at least one antenna, and wherein the at least one control device is configured to control:

the first UWB system to carry out a positioning method based on transit time measurements for determining the position of the second UWB system, the keyless access system to lock or unlock the at least one transportation vehicle door based on a result of the positioning, and the first UWB system for payload data transmission with the at least one third transceiver.

16. The method of claim 15, wherein the control device is further configured to control the first UWB system for payload data communication with the at least one third transceiver, which is a UWB transceiver of a different transportation vehicle.

17. The method of claim 15, wherein the control device is further configured to control the first UWB system for payload data communication with one of the at least one third transceiver, which is a WLAN transceiver of a mobile terminal device.

18. The method of claim 15, wherein the control device includes or controls an interface to a memory and performs at least one of storing payload data received by the first UWB system in the memory and loading payload data to be transmitted by the first UWB system from the memory.

19. The method of claim 12, wherein, following establishment of a connection to at least one transceiver in a transportation vehicle or mobile terminal device that has already received the software update, the first UWB system receives the at least one software update via established UWB connection.

20. The method of claim 19, wherein the software update is received in segmented form via a plurality of third transceivers corresponding respectively to a plurality of transportation vehicles or mobile terminal devices by UWB connections established via the third transceivers.

21. The method of claim 20, wherein an identifier is used for segments of the software update.

22. The method of claim 19, wherein, following receipt of the at least one software update via the established UWB connection, the software update is stored in memory and available for transmission to other transportation vehicles.

* * * * *